US007046213B2

(12) United States Patent
Campbell et al.

(10) Patent No.: US 7,046,213 B2
(45) Date of Patent: May 16, 2006

(54) APPARATUS AND METHOD FOR DIRECT MANIPULATION OF ELECTRONIC INFORMATION

(76) Inventors: Christopher S. Campbell, 3020 Elda La., Santa Cruz, CA (US) 95062; Paul Philip Maglio, 654 Vasona Ave., Los Gatos, CA (US) 95032

(*) Notice: Subject to any disclaimer, the term of this patent is extended or adjusted under 35 U.S.C. 154(b) by 325 days.

(21) Appl. No.: 10/164,883

(22) Filed: Jun. 5, 2002

(65) Prior Publication Data

US 2003/0227438 A1     Dec. 11, 2003

(51) Int. Cl.
*G09G 5/00* (2006.01)
(52) U.S. Cl. .................................. 345/2.2; 345/748
(58) Field of Classification Search ................ 345/1.1, 345/1.2, 1.3, 2.2, 156, 748, 749, 761, 905
See application file for complete search history.

(56) References Cited

U.S. PATENT DOCUMENTS

| 5,530,235 | A | | 6/1996 | Stefik et al. ................. 235/492 |
| 5,613,095 | A | | 3/1997 | Moss et al. ................. 395/500 |
| 5,769,374 | A | | 6/1998 | Martin et al. ................. 248/221 |
| 5,805,415 | A | | 9/1998 | Tran et al. ................... 361/681 |
| 5,821,931 | A | | 10/1998 | Berquist et al. ............. 345/346 |
| 5,883,621 | A | * | 3/1999 | Iwamura ..................... 345/719 |
| 5,920,706 | A | | 7/1999 | Ono ............................ 395/286 |
| 5,948,091 | A | * | 9/1999 | Kerigan et al. ................ 710/10 |
| 5,978,591 | A | | 11/1999 | Bartholomew et al. ..... 395/712 |
| 6,037,954 | A | | 3/2000 | McMahon .................. 345/901 |
| 6,060,993 | A | | 5/2000 | Cohen ......................... 340/691 |
| 6,151,021 | A | | 11/2000 | Berquist et al. ............. 345/339 |
| 6,236,330 | B1 | | 5/2001 | Cohen ......................... 340/691 |
| 6,313,877 | B1 | * | 11/2001 | Anderson ................... 358/906 |
| 6,522,309 | B1 | * | 2/2003 | Weber ......................... 345/1.1 |
| 6,545,669 | B1 | * | 4/2003 | Kinawi et al. ............... 345/1.1 |
| 6,573,913 | B1 | * | 6/2003 | Butler et al. ................. 345/1.3 |
| 6,766,382 | B1 | * | 7/2004 | Madden et al. ............. 709/246 |
| 6,784,855 | B1 | * | 8/2004 | Matthews et al. ........... 345/1.1 |
| 2002/0049784 | A1 | * | 4/2002 | Bauchot ..................... 707/503 |
| 2002/0140688 | A1 | * | 10/2002 | Steinberg et al. ........... 345/205 |
| 2002/0154120 | A1 | * | 10/2002 | Cullimore et al. .......... 345/441 |

OTHER PUBLICATIONS

"Peripheral Displays", Almaden Research Center Poster Session, IBM Almaden 15th Anniversary Celebration and Expo, Jun. 21, 2001.
D. G. Rowe, "Balancing Act", New Scientist, Jul. 7, 2001, p. 23.
"NVIDIA nView Technology: A Revolution in Multi-display Functionality and Performance", nVIDIA Technical Brief-00314-001, Jan. 16, 2002, pp. 1-9.

* cited by examiner

*Primary Examiner*—Ricardo Osorio
(74) *Attorney, Agent, or Firm*—Daniel E. Johnson (57) ABSTRACT

A method of copying images displayed on a monitor onto a screen of a handheld electronic display unit includes electronically detecting the display unit when it is brought to the monitor, e.g., when the unit is connected to a port in the monitor's housing. After the user has received an indication that the display unit has been detected, the user selects an image displayed on the monitor's screen to be copied over to the handheld display unit. The selected image is displayed on the display unit's screen upon completion of the copying procedure. A preferred monitor for use with such a method has a housing that includes one or more data ports for receiving the handheld display unit. When a display unit is connected to a port in the monitor, both the screen of the electronic display unit and the monitor's screen are visible to a user positioned in front of the monitor.

63 Claims, 7 Drawing Sheets

APPARATUS AND METHOD FOR DIRECT MANIPULATION OF ELECTRONIC INFORMATION

TECHNICAL FIELD

The invention is related to information handling, and more particularly, to ways of using handheld devices for transporting information from one work area to another, such as in an office environment.

BACKGROUND

It has almost become a truism that in the Information Age, office workers have become enveloped in information, with some of this information being central to immediate and ongoing tasks, and other information being of less immediate importance. In most offices, information is scattered about in many places. Desk surfaces may be piled high with papers and books; in addition, computer screens, each of which may display different sorts of information, are ubiquitous. Even a single computer screen may be crowded with information, in which e-mail, word processing, and programming applications all occupy a portion of the screen, or alternatively, a different "window". Furthermore, the perimeter of the typical computer screen, as well as the office workspace generally, are often occupied by numerous "sticky" notes to remind the user of various events, things to do, phone numbers, and so on. Indeed, notes on paper do have the advantage of being easy to use when it comes to certain kinds of tasks, such as reading, cross-referencing and annotating information, physically moving information, and posting information (to get someone's attention or remind someone of something). For example, posting information may involve placing information in a place that is physically significant to the user, such as next to the phone.

As the typical work environment has continued to rely on information scattered among available surfaces and objects, managing this information has proven to be cumbersome. Unfortunately, capturing information that is physically strewn about an office does not easily lend itself to an electronic solution. In particular, the notes posted by office workers along the perimeters of their computer screens have so far eluded a means of being handled electronically. There remains a need for handling such information electronically, as well as a need to free electronic information from the confines of an isolated computer screen, thereby allowing information to be distributed more naturally and easily throughout the office environment.

SUMMARY OF THE INVENTION

Preferred embodiments of the present invention address these needs through the use of handheld display screens (such as liquid crystal displays—LCDs) that allow information to be attached to a variety of surfaces, e.g., on a wall or around the edge of a monitor. These display screens have specialized interactivity and functionality and act as dedicated information tools. By placing these handheld display devices along the perimeter of a computer screen, they lend themselves to receiving images displayed on the computer screen and thereby free information that is peripheral to a user's immediate concerns from an already crowded screen. In this way, the handheld display screens can be used to effectively move information off a computer screen and dynamically into the physical world.

Such display screens are well-suited to function as reminders or otherwise provide awareness of information. Thus, preferred embodiments of these display screens may be used to satisfy tasks normally performed with paper, such as posting notes around the office, putting information in one's pocket for later reference, or giving away (visually or informationally enhanced) business cards. Preferred embodiments of these display screens require only the most basic interaction capabilities, such as copying data to and from the display screen, paging through information displayed on the display screen, and pausing the display update, but they need not have computational power or a complex user interface.

One embodiment of the invention is a monitor that has a screen having a perimeter that defines the extent of the screen, and at least one electronic device that generates electronic signals for producing images on the screen. The monitor also includes a housing connected to the perimeter of the screen, in which the housing includes a data port for receiving an electronic display unit. The data port is located near the screen perimeter and is configured such that when an electronic display unit is connected to the data port, both the electronic display unit and the screen are visible to a user positioned in front of the screen. The data port is preferably configured to receive an electronic display unit that is, when connected to the data port, substantially parallel to the screen. In one preferred embodiment, the data port is located within 5 cm of the screen perimeter. The housing may include 3 or more such data ports.

Another embodiment of the invention is a monitor that includes a screen having a perimeter that defines the extent of the screen, and at least one electronic device that generates electronic signals for producing images on the screen. The monitor also includes a housing connected to the screen perimeter, with this housing including at least 2 data ports for receiving an electronic display unit. Data ports are located near the screen perimeter. The housing may include at least 4 data ports located near the screen perimeter, e.g., within 2 cm of the screen perimeter.

One implementation of the invention is a method of copying images displayed on a monitor to a handheld electronic display unit, in which the display unit and the monitor include respective screens for displaying images. The method includes electronically detecting the presence of the display unit in response to it being brought to the monitor by a user. The method further includes providing an indication to the user that the display unit has been detected, and electronically copying a user-selected image that is displayed on the monitor's screen to the display unit, wherein the selected image is displayed on the display unit's screen upon completion of the copying. This indication may include visual feedback on the screen. The image as it is displayed on the display unit's screen is preferably large enough that a user can view and understand its contents simply by looking at the display unit's screen, and the selected image is advantageously displayed both on the monitor's screen and the display unit's screen upon completion of the copying. In one preferred embodiment, the monitor includes a port for receiving the display unit, in which the display unit is detected in response to being connected to the port. The port may be located near an edge of the screen. In one preferred implementation, the presence of the display unit is electronically detected in response to being brought within 5 cm of the monitor's screen, and in another implementation, the display unit is electronically detected in response to being brought within 2 cm of the monitor's screen. In one preferred implementation, this detection may occur wirelessly, and data and images may be transferred wirelessly from (or to) a processor connected to the monitor.

The method may further include, after a user has brought the display unit to a second monitor having a screen, electronically copying the selected image from the display unit onto the screen of the second monitor. This may involve the display unit being connected to a port on the second monitor. The method may include providing an indication on the second monitor's screen that the display unit has been connected to the port on the second monitor, and providing a graphical user interface on the second monitor's screen to permit the user to copy the selected image to the second monitor's screen.

In other implementations, there are provided handheld electronic display units to be used in carrying out any of the methods herein.

In still other implementations, there are provided computer program products for carrying out any of the methods herein.

DETAILED DESCRIPTION OF THE INVENTION

Overview

Preferred implementations of the invention provide a user with the ability to quickly and seamlessly move information between a hand held device and computers/monitors. By way of example, and with respect to FIG. 1, a monitor 20 is shown that includes electronics 26 for generating electronic signals that produce one or more images 32 on a screen 38 of the monitor 20. The screen 38 is surrounded by a housing 44. A portion of the housing 44 near the perimeter of the screen 38 includes one or more data ports 50 designed to receive an electronic display unit 56 that has its own screen 60. These data ports are preferably located within 5 cm of the perimeter of the screen 38, and more preferably within 2 or even 1 cm. The monitor 20 is in electronic communication with a processor 62 (such as a computer), which contains electronically stored information that is communicated to the electronics 26 of the monitor 20 for display on the screen 38.

Figure 1:
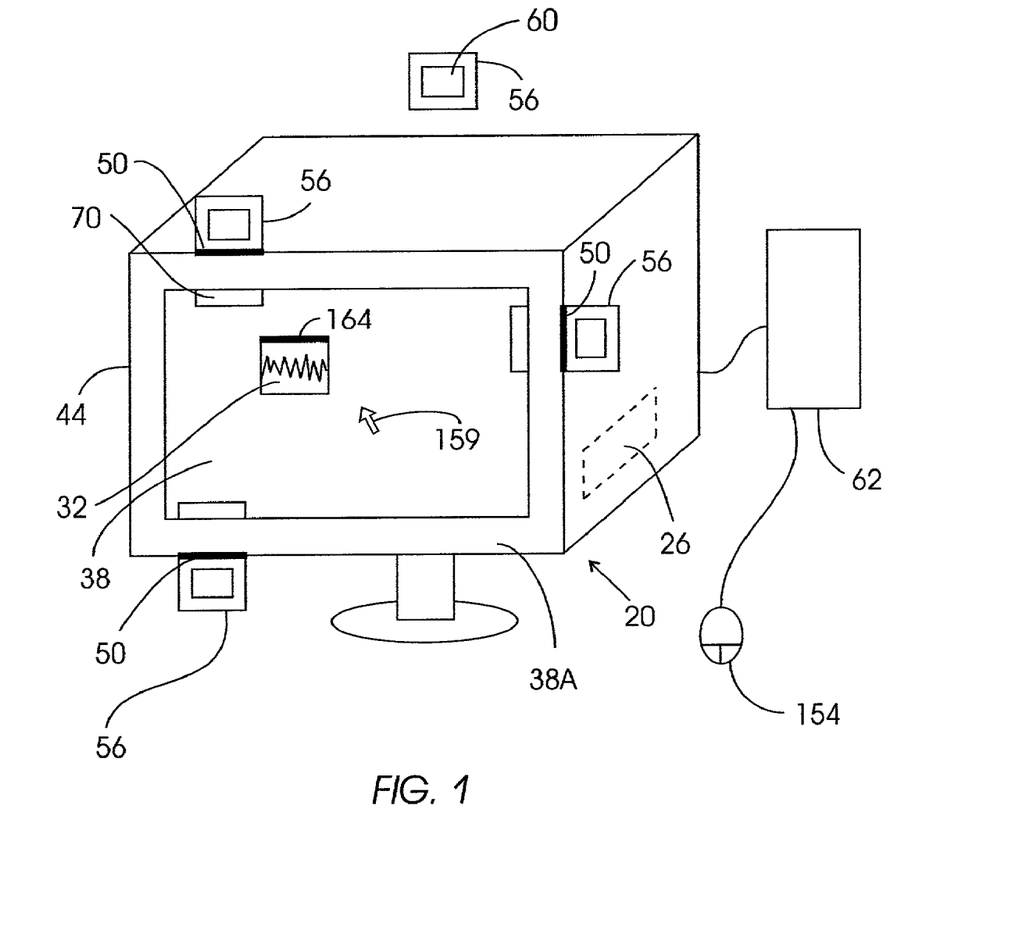
FIG. 1 is a schematic of a preferred embodiment of the invention, in which a hand held display unit that includes a screen is attached to one of several ports on a monitor that is in electronic communication with a processor.

As discussed in more detail below, the display unit 56 has a connector that mates with the data port 50 in the monitor's housing 44. The data port 50 and the display unit 56 preferably mate in such a way that the display unit is clearly visible to a user positioned in front of the screen 38. For example, when the display unit 56 is connected to the data port 50, the face of the display unit is preferably aligned parallel with the face of the screen 38. In this way, the user can easily view what is displayed on the screen 38 and the display unit 56 at the same time. As shown in FIG. 1, the monitor 20 may include several data ports 50, so that more than one display unit 56 may be simultaneously connected to the monitor 20. For example, the housing may include at least 2 data ports, or at least one data port can be placed at each of the top, right, and left sides of the housing 44 surrounding the monitor's screen 38. Alternatively, at least one data port may be placed at each of the four sides of the housing 44. In addition, electronics such as those in the processor 62 may be used to detect when a display unit has been connected to (or disconnected from) any given data port 50 when the data port 50 includes a USB port. If the data port 50 includes a serial port, then software may be used to determine whether a display unit has been connected to the data port.

The apparatus shown in FIG. 1 is useful for electronically copying images from the screen 38 of the monitor 20 onto the screen 60 of the display unit 56 (or vice versa). In a preferred implementation, the display unit 56 is detected electronically when it is brought in proximity with or connected to the monitor 20, e.g., when the display unit is connected to the data port 50. The user is then presented with an indication that the display unit has been detected, e.g., visual feedback such as a graphical user interface 70 (GUI) in the form of a graphical tab is displayed on the screen 38, or audio means may be used. As described in greater detail below, the user selects an image on the screen 38 to be copied to the display unit 56. The selected image is then copied to the display unit 56, so that the image is visible on the screen 60 upon completion of the copying, e.g., essentially immediately (for example, within one second) upon completion of the copying and without further input or manipulation on the part of the user. Less preferably, this occurs within 5 seconds after the copying has been completed. At this point, the selected image is preferably visible on both the screen 38 (of the monitor 20) and the screen 60 (of the display unit 56). The image on the screen 60 is preferably large enough that the user can view and understand its contents without further electronic input or manipulation.

The display unit 56 may then be transported by the user to another location, e.g., to a place where it is conspicuous (such as on a refrigerator door) to serve as a reminder to the user; in this application, the display unit functions essentially as a "note". (To this end, the back side of the display unit 56 may include appropriate attachment means, such as adhesive, Velcro™, or a magnet.) Alternatively, the display unit 56 may be brought to the screen of a second monitor (not shown) and connected to a data port in that monitor's housing (similar to the configuration shown in FIG. 1), with the image then being electronically copied from the display unit onto the second monitor's screen (via its associated processor or computer). In this application, the display unit serves as means by which an image (with or without associated data) is copied (moved) to another location. In a preferred implementation, after the display unit 56 is connected to a data port 50 on the second monitor, an indication is provided to the user (e.g., a visual indication on the screen of the second monitor, such as a graphical tab 70 near or at the perimeter of the monitor's screen at a location near the display unit graphical user interface, or audio means may be used) that the display unit has indeed been connected to the data port. A graphical user interface appearing on the screen of the second monitor is then used in copying over the image to the second monitor. As part of this copying procedure, a cursor on the screen of the second monitor may be moved by the user towards that portion of the perimeter of the screen near where the display unit 56 has been connected. The user may then select or grab information from the graphical tab 70 appearing on the second monitor and place, drop, or paste the information anywhere in the graphical user interface on the second monitor.

Hardware Architecture

In addition to the software architecture described below, various hardware is used for the preferred embodiments and implementations of the invention described herein. The hardware involved includes the display unit 56, the monitor 20, the processor 62, and any associated peripheral devices in electronic communication with the processor, such as a mouse 154.

Figure 2:
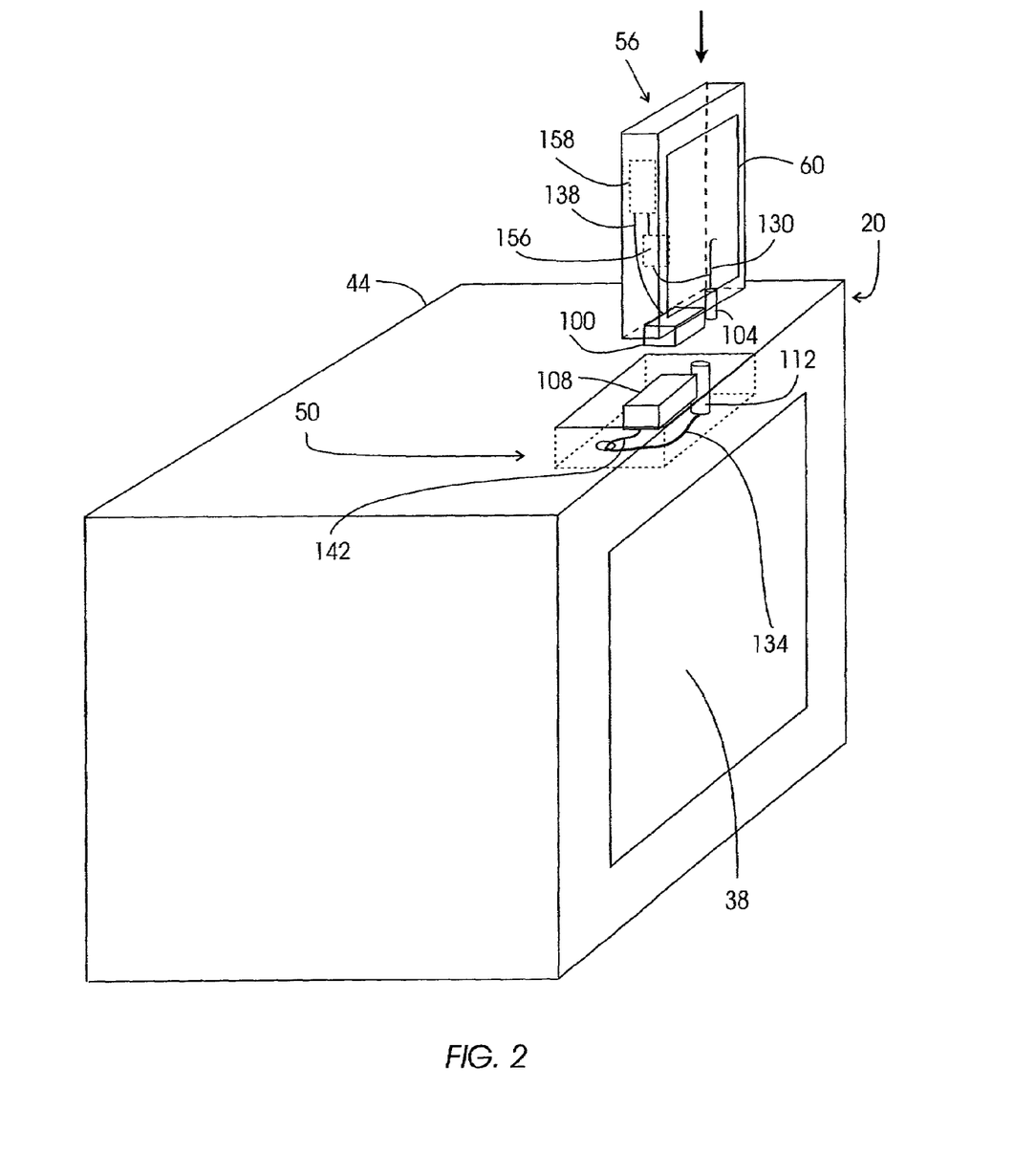
FIG. 2 is an expanded view of one of the ports in the monitor.

The display unit 56 itself includes a screen 60, a battery 156 (that is preferably wired in parallel with the screen 60), as well as several electronic components in electrical communication with each other that are designated collectively in FIG. 2 as numeral 158: a graphics controller chip (or card), nonvolatile main memory, a central processing unit (CPU), and a port interface that includes an I/O controller chip. In one working embodiment of the display unit, the screen 60 includes a color reflective thin film transistor (TFT) LCD with 64K colors, 240×320 resolution, and a backlight. The size of the display is 2.26×3.02 inches, or about as large as a conventional "yellow sticky" note. The graphics controller or liquid crystal display controller (LCDC) uses direct memory access (DMA) from main memory (it does not require video random access memory (RAM)) and is programmed in 16-bit TFT mode. (Note that as better Organic Liquid Crystal Displays (OLED) and e-Ink become available, their lower power requirements may make them even more desirable for use in the display unit 56.) The CPU is a 206 MHz Intel StrongARM SA-1110 32-bit RISC and the main memory is 32 MB of SDRAM and 32 MB of Flash ROM. The port interface includes the female serial port connector 100, as well as an RS-232 interface that contains a synchronous data link controller (SDLC) and universal asynchronous receiver/transmitter (UART) serial controller.

The battery 156 is a 1400 mA lithium polymer battery. Recharging of the battery 156 is accomplished by supplying DC 5 volts at 2.0 A via the female and male power connectors 104 and 112. The power wires 130, 134 are connected to a transformer (not shown) that in turn is supplied by a 100–240 volt AC power source (e.g., via a standard outlet). This ensures that the batteries of the display units 56 are being recharged whenever the display units are connected to a port 50. The user connects the display unit 56 to one of the ports 50 on the monitor 20 (see FIG. 1).

The display unit 56 shown in FIG. 2 includes a female serial port connector 100 and a female power connector 104, which mate with a male serial port connector 108 and a male power connector 112, respectively. The male serial port connector 108 and the male power connector 112 constitute components of the data port 50 in the housing 44 of the monitor 20. In a preferred embodiment, the female serial port connector 100 and the male serial port connector 108 are of the 9-pin variety. As shown in FIG. 2, the serial male connector 108 is mounted along the perimeter of the monitor 20 such that when it is mated with the female serial connector 100 of the display unit 56, the screen 60 of the display unit 56 is parallel with (and facing in the same direction as) the screen 38 of the monitor 20. The screen 60 of the display unit 56 advantageously includes LCDs that receive power via a wire 130 connected to the female power connector 104, with power being supplied to the male power connector 112 via a wire 134 that is tied to the monitor's power source (not shown). Similarly, electrical signals are transported to the screen 60 from the female serial port connector 100 via a wire 138, and to the male serial port connector 108 via a wire 142 that is in electrical communication with the processor 62. The wires 130, 134, 138, and 142 are all preferably shielded against high-voltage.

Figure 3:
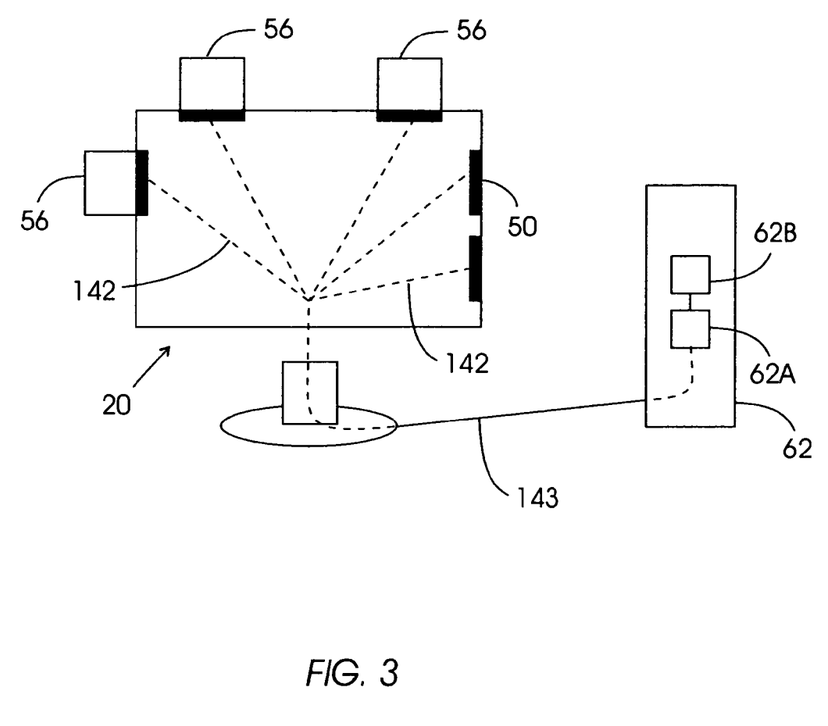
FIG. 3 shows how several ports in the monitor may be interfaced with the processor.

As shown in FIG. 3, the processor 62 preferably includes a hub 62a, so that multiple ports 50 in the monitor 20 can be used. In one embodiment, the hub 62a is a serial port expander that is connected to the processor's PCI Bus 62b. Connected to the hub 62a is a bundle of extension wires 142 or cables for routing the serial ports to the monitor's housing 44 (see FIG. 3). For clarity, the power wires 134 or cables are not shown in FIG. 3, which shows a rear view of the monitor 20. The ports 50 in the monitor 20 include the male serial port connector 108, the male power connector 112, as well as a docking bracket (not shown) that can be attached to the display unit 56 to maintain the alignment of the male and female port and power connectors once they have been secured together. As shown above in FIG. 2, the ports 50 are mounted into a portion of the housing 44 of the monitor 40 that does not directly face the user. Alternatively, the ports 50 may be mounted on the front face 38a of the monitor 20. As USB ports become more universal, it may be preferable to use serial-to-USB converters on the serial ports mounted in the monitor 20 and then replace the serial port expander with a USB hub, since USB ports have the benefits of higher data throughput and power built directly into the connector. In this case, the USB hub connects directly to a USB port on the processor 62.

Copying Images and Data to the Display Unit 56

Preferred implementations are now described in connection with copying images appearing on the screen 38 of a monitor 20 (and residing electronically in the processor 62, which is in communication with the monitor) to the display unit 56. The electronic display unit 56 includes memory; if this memory is "blank" prior to use, no image appears on the screen 60. When the display unit 56 is initially connected to the port 50, the screen 60 of the display unit preferably remains blank. Following this connection, the display unit 56 and the host software in the processor 62 exchange configuration information. The display unit 56 reports its display size, the image format required for display, memory size, and memory/display contents (if any) to the processor's software. The processor's software reports the orientation of the display unit 56 with respect to the monitor 20, which is determined by the location of that port to which the display unit is connected. For example, if the display unit 56 is attached to the bottom of the monitor 20, then the orientation of the image on the display unit 56 is ideally rotated 180 degrees with respect to what it would be if the display unit were attached to the top of the monitor.

The processor 62 provides feedback to the user when the display unit 56 is connected to the data port 50. This feedback is preferably in the form of the graphical user interface 70 or graphical tab (see FIG. 1) appearing at that location along the perimeter of the monitors screen 38 where the display unit 56 is connected, so that the GUI 70 appears directly across from the display unit. In a preferred embodiment, the GUI 70 and the display unit 56 have substantially the same width, as indicated in FIG. 1.

A user may now send an image (appearing on a web page, for example) or, alternatively, data (such as a file in a directory or a section of text in an open application) to the display unit 56 after selecting the image (or data) using one of several selection methods. First, the user may use a standard method offered by the operating system to select the image. Using a cursor 159 on the monitor's screen 38 controlled by the mouse 154, the user can then drag the selected information to the graphical tab 70 and drop the information anywhere onto the tab (i.e., a "drag-and-drop" procedure). In a preferred implementation, the graphical tab 70 appears on the screen 38 at a location adjacent or nearly adjacent the display unit 56, thereby allowing the user to conveniently move information from anywhere on the monitor screen 38 to the peripheral display unit 56. Once the user positions the cursor 159 over the graphical tab 70, the tab may advantageously increase its brightness, indicating to the user that the image may now be copied to the display unit 56 (e.g., by releasing the mouse 154).

Figure 4:
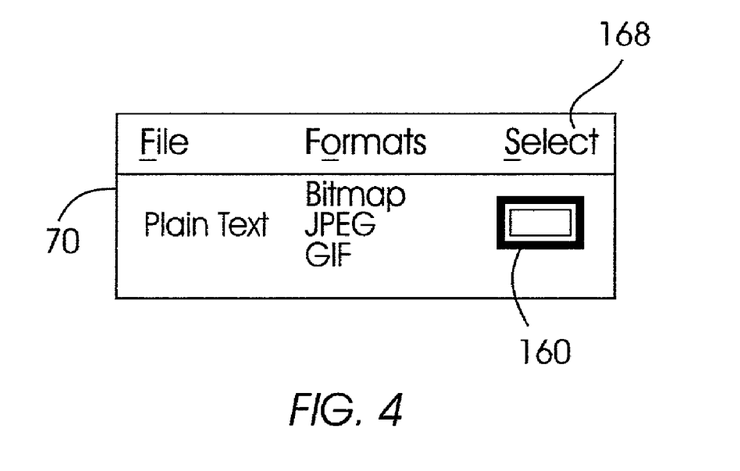
FIG. 4 is a view of a graphical tab that appears on the monitor, in which the tab facilitates the copying of an image on the monitor's screen to the display unit.

In another selection method, the user may cut a selected image into the clipboard, move the cursor 159 to the graphical tab 70, and paste the selected image from the clipboard into the graphical tab (i.e., a cut-and-paste procedure). FIG. 4 shows one implementation of a graphical tab 70. Shown on the right hand side of the graphical tab 70 is an icon 160 of a square that the user may click to obtain a selection square 164 (like the one shown in FIG. 1) that then appears in place of the cursor 159 and advantageously has the same size and orientation as the screen 60 of the display unit 56. The user may then move the selection square 164 around the monitor's screen 38 with the mouse 154. By placing the selection square 164 over a desired portion of the monitor's screen 38 and then clicking on the left mouse button, for example, the image appearing in that portion of the screen 38 is copied pixel-for-pixel to the screen 60 of the display unit 56, and the selection square disappears.

In yet another selection method, the user may select an image by selecting a window in a windows style GUI, and move the selected window until it overlaps the graphical tab 70, thereby transferring the contents of the selected window to the display unit 56 and its screen 60 (i.e., a snapshot window procedure). This selection method (as well as the others described herein) can be repeated: By changing the contents of the selection window, and then overlapping the selection window with the graphical tab 70, the newly selected contents are then sent to the display unit 56 and its screen 60, replacing the previous contents.

Additional selection methods and options can be made available to the user through the "Select" label 168 on the top row of menu options. For example, an option can be offered to the user in which the contents of a given window are always simultaneously displayed on the screen 60 of the display unit 56 and the monitor's screen 38, even when this given window is obscured by other windows on the screen 38 of the monitor 20. By selecting this option from a pull-down menu (not shown) under the select label 168, the cursor turns into a crosshair (not shown) which can then be used to define a window that about a desired image. By left clicking (with the mouse 154) on a window so selected, the desired image is transferred to the display unit 60, at which point the crosshair returns to a cursor. Such a selection option allows the user to keep information in a window always visible to him or her, since the image so selected is viewable to the user on the screen 60 of the display unit 56. Still other selection methods may occur to those skilled in the art.

Any of the aforementioned methods can be used to transfer an image (or, more generally, data) displayed on the monitor's screen 38 from the processor 62 to the display unit 56. Once an image is selected, it is preferably converted into at least two formats: an image format for display on the screen 60 of the display unit 56, as well as a native format to be held in the memory of the display unit. For example, if text is selected by the user, the text is advantageously converted to a Bitmap image file, and this Bitmap image file and the associated ASCII text file(s) are transferred over to the display unit 56 via the serial connection (defined by the female and male serial port connectors 100 and 108). The Bitmap or other image file is preferably sent first so that the display unit 56 can display it as soon as possible. The display unit 56 detects that new data has been sent to it and sends the image file directly to the screen 60, with any associated files (e.g., ASCII text files) then being put into the memory of the display unit 56. Any image that had been displayed on the screen 60 of the display unit 56 or had been held in memory is replaced with the new information. It may also be desirable to convert data into several different formats. For example, a Microsoft Word document (i.e., .doc file) can be converted into Rich Text Format, ASCII format, and Bitmap format. All of these formats can then be transferred to the display unit 56 for later use by the user.

Thus, when the user selects an image or other information to be sent to the display unit 56, the information is displayed on the screen 60 almost immediately, with the image being visible on both the monitor's screen 38 and the display unit's screen 56. The graphical tab 70 may also advantageously show the formats of the information currently held in the display unit 56, as indicated by the textual labels "Bitmap", "Plain Text", "JPEG", and "GIF" shown in FIG. 4. Once an image has been copied onto the display unit 56, the display unit may be physically disconnected from the data port 50 of the monitor 20, resulting in the graphical tab 70 disappearing from the screen 38 of the monitor 20. Even when disconnected from the monitor 20, the display unit 56 preferably retains the copied image and associated data in its memory as well as on the screen 60 of the display unit 56 display, for as long as power allows.

Copying Images and Data from the Display Unit 56 to a Processor/Monitor

An image (or other information) appearing on the screen 60 of the display unit 56 may be copied from the display unit to a processor, so that the image can then be displayed on the screen of a monitor in electronic communication with that processor. This may be done by connecting the display unit 56 to a data port 50 on a monitor, e.g., a (second) monitor other than the one to which the display unit was connected when the image was copied to the display unit. Alternatively, the display unit 56 can be connected to any compatible serial port, such as one mounted in the CPU housing of a computer. After the display unit 56 has been connected to such a port, the display unit and the software in the processor exchange configuration information, as outlined above in connection with copying data to the display unit. A graphical tab like the tab 70 then preferably appears on the screen of the second monitor, providing an indication to the user that the display unit 56 has been connected. If the display unit has data in its memory, the graphical tab advantageously shows the data formats available on the display unit 56 using text labels (such as those shown in FIG. 4). Since the most desired format may be the native format of the data, the native format may be advantageously listed in large font on the leftmost segment of the graphical tab 70 (again, as shown in FIG. 4), whereas additional formats are listed in smaller font in the middle of the tab 70. The "Format" pull-down menu can be left-clicked for a complete listing of available formats.

An image can be copied from the display unit 56 using cut-and-paste, drag-and drop, and pull-down menu interactions, analogous to those described above in connection with copying an image to the display unit 56. Preferred methods for performing these copy operations are now described with reference to the graphical tab 70 shown in FIG. 4. For a drag-and-drop operation, the user depresses the left mouse button when the cursor 159 is over the desired label on the graphical tab 70, moves the cursor to the location where the image is to be dropped, and releases the left mouse button. For a cut-and-paste operation, the user simply right-clicks the desired label and a menu appears with the option to copy the information into the clipboard. The user can also copy information in a given format by left-clicking the desired label and then typing control-C. Then, information in the clipboard can be pasted into an open application. For a pull-down menu operation, the user left clicks the "Formats" label on the tab 70 to get the menu. The user can then drag one of the desired formats off the menu and into an open application of the processor tied to the monitor.

Figure 5:
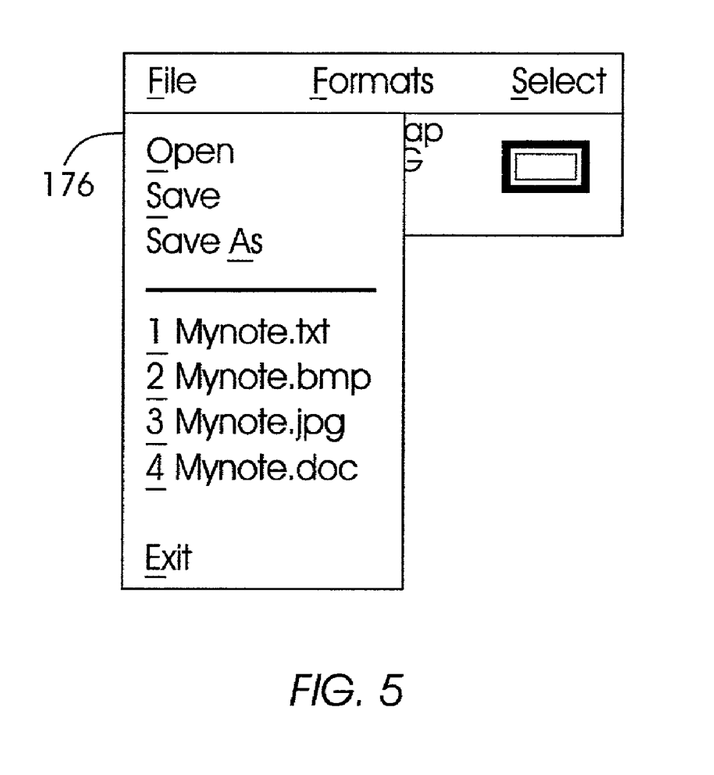
FIG. 5 shows a file pull-down menu for the graphical tab of FIG. 4.

The user can also work with information in the display unit 56 as a file using a File pull-down menu 176, as shown in FIG. 5. This pull-down menu 176 on the graphical tab 70 (on the monitor's screen 38) allows the user to perform standard file functions used in most operating systems, such as "open", "save", and "save as", and preferred implementations of these functions are now described. When the user selects "open", the standard open file dialog box (not shown) is displayed allowing the user to navigate the file system and select a file to put into the display unit 56. If the user selects "save", all the formats of the current contents of the display unit are saved in the \temp directory (/tmp for Unix systems), one file for each format. If the \temp directory does not exist, then it is created. The filename "mynote" is used for each file saved. If that filename already exists, then a digit is added to the end of the filename (e.g., "mynote1"), and incremented until a unique filename is generated. The "save as" option allows the user to select the name, format, and location to save the information in the memory of the display unit 56. The File pull-down menu 176 also has a list of files below these standard file functions: The user can use a drag-and-drop procedure to move one or more of these files directly into, for example, a folder, the Windows Explorer, or any other GUI for file navigation.

Software Architecture

The architecture used for the preferred embodiments and implementations of the invention herein is now described, including that for the "client" software of the display unit 56 and the "host" software of the processor 62/monitor 20. The client software used was built on a client-host model similar to that used in many network applications, in which client software runs on a client computer that is connected over a network to a server (i.e., the host). In the embodiments and implementations of the invention described herein, the client software runs on the display unit 56, and the host software runs on the processor 62 that drives the monitor 20; thus, the display unit 56 functions as the client and the processor 62 as the host. The software on the display unit 56 advantageously performs several functions, including: 1) displaying an image of the data transferred to it; 2) detecting when new data is sent from the processor 62; 3) detecting requests for data from the processor; and 4) storing and sending configuration data. On the other hand, the software on the processor 62 advantageously performs several functions, including: 1) detecting the presence of the display unit 56 in the port 50; 2) establishing a connection with the display unit; 3) requesting data from the display unit; 4) sending data to the display unit; 5) providing a user interface to the display unit; 6) providing feedback about the state of the display unit system; and 7) translating data prior to sending it to the display unit.

The software on the processor 62 was written in Sun's Java version 1.3 Standard Edition for the Microsoft Windows (98/NT/2000) operating system. The software on the display unit 56 was Sun's Personal Java for the Microsoft Windows CE operating system. This software design allows for relatively easy portability to new devices and operating systems. It also allows the host and client devices to operate independently so that, for instance, if the (host) processor 62 loses power, any display units 56 connected to the monitor 20 will continue to operate and display information.

Figure 6:
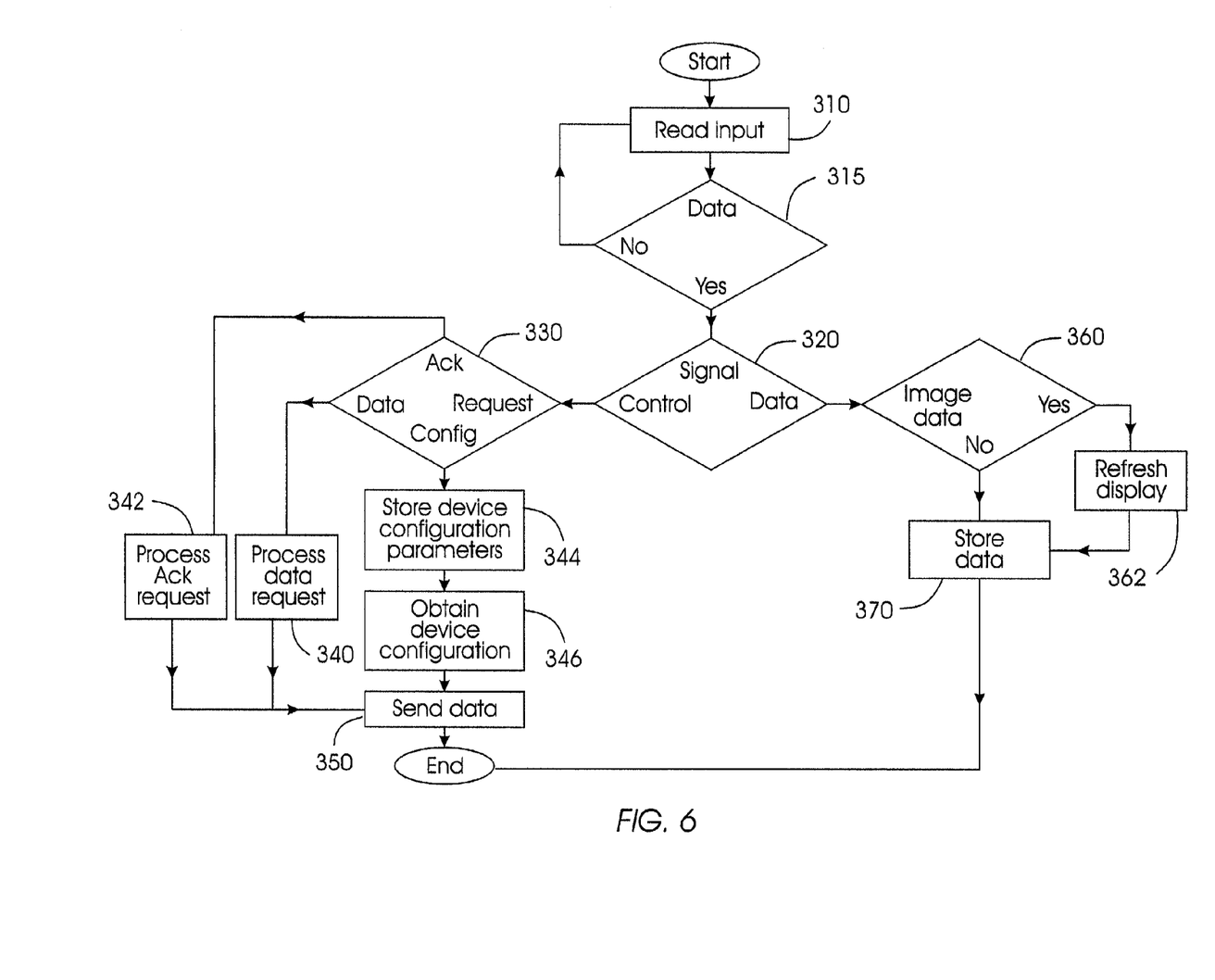
FIG. 6 is flowchart diagram outlining software used in the display unit.

1. Client Software (FIG. 6)

As indicated in steps 310 and 315, the (client) software on the display unit 56 continuously listens for data sent through the serial port, via the (female and male) serial port connectors 100 and 108. A determination is made whether the data received are in the form of a control signal byte or a data signal byte (step 320), with the client software handling each possibility accordingly. Receiving a control signal indicates that the processor 62 (host) is sending a request, whereas receiving a data signal indicates that data are being sent.

As shown by step 330, if a control signal is being sent, a determination is made whether i) the request is for data from the display unit's memory (this possibility is indicated in step 330 of FIG. 6 as "data"), ii) to get/set the display unit's configuration information (step 300, "Config"), or iii) to send an acknowledgment back to the processor 62 (step 330, "Ack"). Each of these three possibilities is now considered in turn. If the processor 62 is requesting data, the client software retrieves that data from memory (step 340) and sends the retrieved data through the serial port (step 350). If an Acknowledgment is requested, a byte length code is returned (step 342), e.g., ASCII code 6. If the processor 62 is getting/setting configuration information, the client software first stores the configuration settings in memory (step 344), reads all configuration settings from memory (step 346), and then sends them to the processor 62 (step 350). Configuration settings for the client software are embedded in the request from the host (i.e., the processor 62). For example, when the display unit 56 is first connected to the host's monitor 20, the host software sends a control signal requesting configuration information. Embedded in that request is information regarding the physical orientation of the display unit 56, which is given by the location of the port to which the display unit is connected. These orientation data are stored by the client software so that all new data are displayed right-side-up on the screen 60 of the display unit 56. The orientation data are stored as a number 1 through 5, with 1, 2, 3, and 4 being mapped to top, bottom, left, and right, respectively, and 5 being mapped to the serial port at the rear of the processor 62. Additional configuration information that the host may send to the client software includes user preferences. The request is 256 bytes long, and the configuration information sent back to the host is 2048 bytes, with the first byte being the control signal.

On the other hand, if the data received are in the form of a data signal byte ("Data", step 320), this is an indication that the processor 62 is sending data to be stored in the display unit's memory. If the data being sent are determined (step 360) to be images data of the correct format (e.g., Bitmap), then those data are used to refresh the screen 60 of the display unit 56 (step 362). The refresh process is performed by obtaining the image data, obtaining the current orientation from memory, and mapping the image data in the correct orientation to a temporary memory space (e.g., an application memory in which the image is assembled; this process is known as double-buffering). Finally, the image in the temporary memory space is swapped into DMA for a clean transition to the new image. After being displayed, the image is sent to memory to be stored (step 370). All other incoming data (step 370, "No"), such as non-image data, are sent directly to memory.

2. Host Software (FIGS. 7 and 8)

Figure 7:
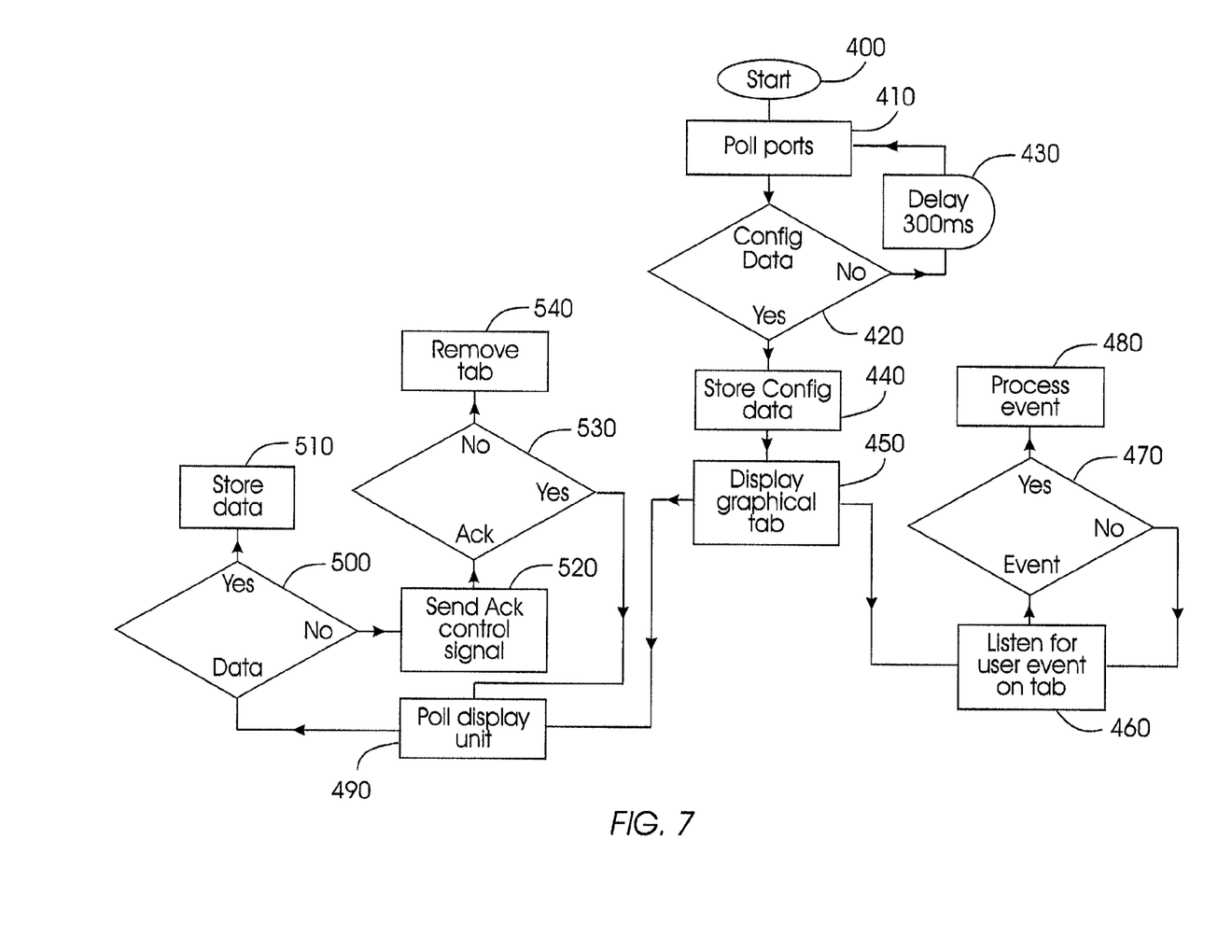
FIGS. 7 and 8 are flowchart diagrams outlining software used in the processor.
Figure 8:
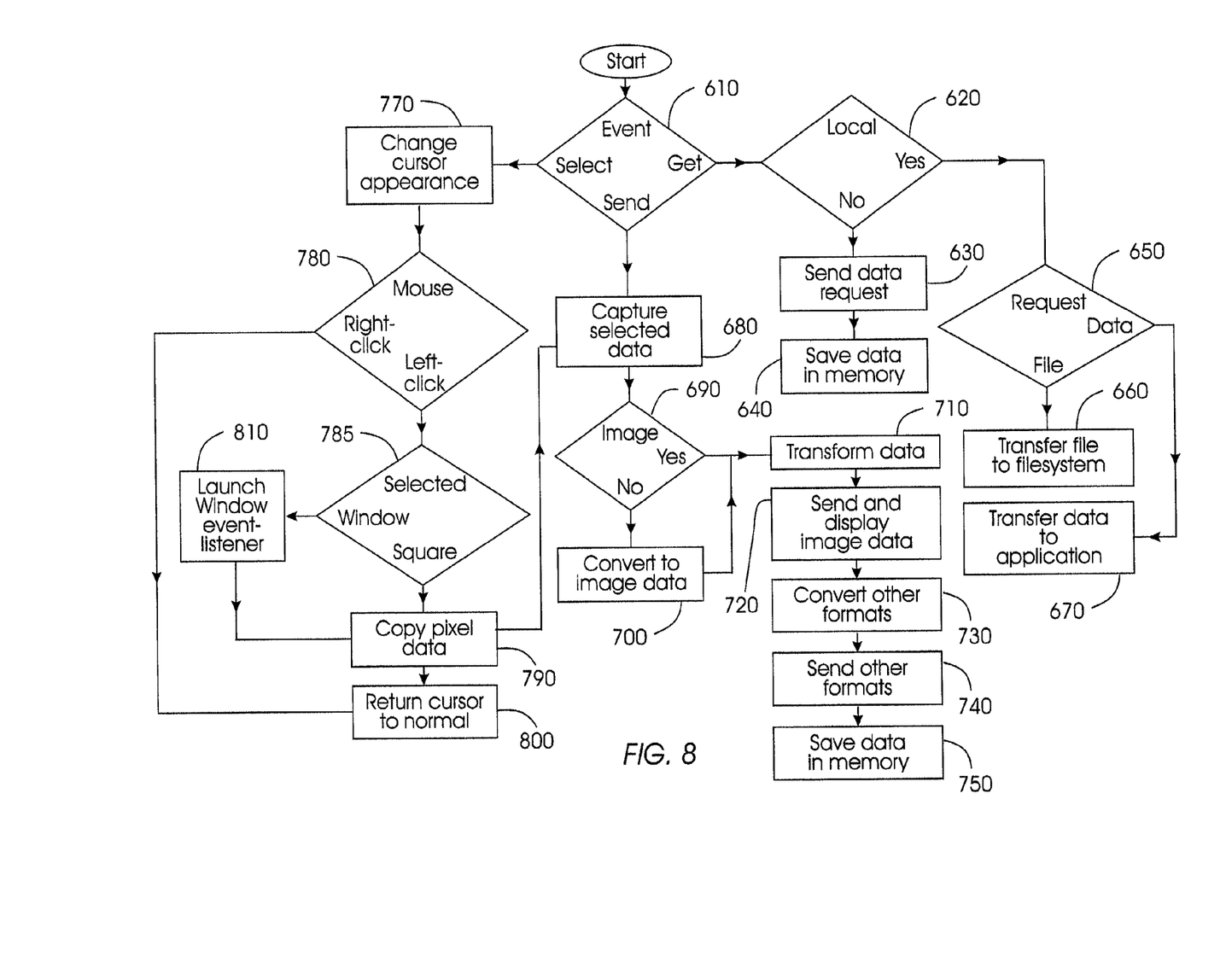

As indicated in FIG. 7, the host application runs on the host computer system (the processor 62) at startup (step 400) and polls all the available empty serial ports in an attempt to find a connected display unit 56 (steps 410, 420, 430). The polling process is performed by sending a control signal request for configuration information to each port 50 in succession (step 410). Embedded in the request is the orientation data based on the location of the port 50. Within the host application memory is a port-table that maps all COM ports to a physical location; i.e., COM1—top, COM2—bottom, COM3—left, COM4—right. A determination is made as to whether configuration data is received (step 420). A wait is inserted in this polling process (step 430) to ensure that the host CPU 62 is not over-utilized by the host application. When the host application gets configuration information back from a port 50 ("Yes" of step 420), it knows that a display unit 56 is connected at that location. Once a display unit 56 is detected, the host application saves the configuration information in application memory and updates the port-table to reflect that one port is now occupied (step 440).

Next, configuration information from application memory is retrieved, the graphical tab 70 is processed and displayed (step 450) on the monitor 20 at the location of the newly occupied port 50. Using Java, the graphical tab 70 is a window object similar to any other window in a GUI, but without a title bar or border. The graphical tab 70 is preferably set to always be "on-top", so that it cannot be obscured by other windows. Java facilitates including the same user interface functions to the graphical tab 70 that all other windows have, including drag-and-drop (on and off the tab), cut-and-paste, and select. Adding these standard user interface capabilities is done by creating an event listener for the graphical tab 70. For each display unit 56 in communication with the processor 62 via a port 50, a new graphical tab window object is created and shown on the monitor 20, and assigned an event listener. The event listener waits for some user action to occur (step 460) and then signals the host application, if appropriate ("Yes" of step 470). How these events are processed (step 480) is covered in greater detail below (see FIG. 8).

After the graphical tab 70 is deployed, the host application polls the display unit 56 for data, i.e., whether configuration data (information) or file data are being transmitted by the display unit 56 in response to the poll (step 500). If either kind of data is found, then the data are stored in application memory (step 510). If no data are found, then the host application sends an acknowledgment (ACK) request to the display unit 56 (step 520). The host application waits for an acknowledgment response, and if a response is received ("Yes" of step 530), then the host application continues polling. If no response is received ("No" of step 530), the host application assumes the display unit 56 has been disconnected. The port-table is updated to reflect the fact that the previously occupied port is now unoccupied, and the associated graphical tab 70 is removed from the monitor 20 (step 540). Throughout this process, the host application runs three different threads, as indicated by steps 410, 490, and 460, namely, (a) an empty port polling thread to detect if a display unit 56 has been attached to the (host) processor 62; (b) an occupied port polling thread to collect data and detect if a display unit has been disconnected; and (c) an event listener thread to detect user interface actions. Information about which ports 50 are empty and which are occupied is kept in the port-table in application memory.

User interactions with the graphical tab 70 are now described with respect to FIG. 8. An event is generated (step 610) whenever the user interacts with the graphical tab 70, with the generated event falling into one of three categories of requests: (a) getting information from a display unit 56; (b) sending information to a display unit; and (c) using a special selection method to send information to a display unit. These are discussed in turn. With respect to (a), the user may request information from a display unit 56 with cut-and-paste, drag-and-drop, or the "Save" and "Save as" options from the file menu, as discussed previously. These options signal the host application to get information from the display unit 56. The host application first looks through its local application memory to see if a local copy can be provided instead of downloading from the display unit 56 (step 620). If no local copy is in memory, a data request is sent to the display unit 56 (step 630). The host application then waits until all the data is received from the display unit 56, saves a copy in memory (step 640), and sends the data to the location requested by the user (step 650). If the user requested a file, the data is saved as a file in the file system (step 660). If the user was performing a cut-and-paste or drag-and-drop procedure, the information is automatically given the filename "mynote" with a digit at the end, e.g., "myfile1.txt", or if that filename already exists, the digit is incremented until a unique filename is generated. On the other hand, if the user requested raw data instead of a file, the data is transferred either into an application (drag-and-drop) or the clipboard (cut-and-paste), as indicated by step 670 of FIG. 8.

As indicated in step 610 ("send"), the user may send information or data to the display unit 56 by one of number of procedures discussed previously, including dragging a filename or data (e.g., with a cursor) to the graphical tab 70, cutting data into the clipboard and pasting it into the graphical tab, and opening a file with the File pull-down menu. Regardless of which procedure is used to send data to the display unit 56, the host application processes the request in the same way. First, the selected file or data are captured (step 680). A determination is made whether the data are already image data in the correct Bitmap format (step 690), and if not, these data are converted into that format (step 700). This conversion (step 700) is easier if the data are already in an image format; if, however, the data are plain text or rich text, the text is preferably fit into an area that is the same size as the screen 60 of the display unit 56. This is done by performing word-wrap and adjusting the font size until a maximum amount of text is visible on the screen 60 of the display unit 56. In the case of rich text data, the layout is preserved (e.g., relative font sizes, paragraphs, underlines). If the image data generated from the text data are still larger than the display area of the screen 60, then the image is left at that size and only the upper right corner of the image is seen on the display unit 56. If the image data were not converted form text, but rather another image, then the image data are transformed according to the configuration parameters stored in the port-table (step 710). The transformation step may be unnecessary if the data are copied directly to the display unit 56 (e.g., by using a selection square 164 as discussed previously). If the image data are larger than the screen 60 of the display unit 56, then the transformer tries to shrink the image by up to 20% in the x and y dimensions. The transformer will also try to warp the image space so that "blank" areas are reduced in size. (Blank areas are locations in the image with small changes in pixel intensities.) If the image is still larger than the screen 60, the image is left at that size, and only the upper-right corner is seen on the display. After conversion (if this is necessary, see step 700) and transformation (step 710), the image data are sent to the display unit 56 (step 720). After the display unit 56 receives all the data, the data are displayed (preferably) immediately. Next, the host application converts the selected data into any other desired formats (step 730) and sends those data to the display unit 56 (step 740) for storage in the display unit's memory—the image data and all formats are saved in the local application memory (step 750) on the host (processor 62).

As indicated in step 610 ("select"), the user may also request a special selection method from the graphical tab 70. If the selection square 164 is chosen (which is represented later in the flowchart as decision 785), the cursor 159 is converted to the image of a selection band that is the size of the display unit 56 in pixels and has the same orientation (step 770). The user may move this selection square (164) around the screen 38 of the monitor 20 just like the cursor 159. A system-hook is activated that allows the host application to intercept system events such as mouse clicks. If the user right-clicks (step 780, "right-click") when the selection square 164 is displayed, the cursor 159 reappears and nothing is selected. If the user left-clicks (step 780, "left click"), then the pixels in the selection square 164 are copied and this copied image data is sent to the display unit 56, corresponding to the "square" option shown in the selection decision 785 (a decision which has been previously made by the user). After the image has been copied, the selection square 164 is replaced by the cursor (step 800).

If the user wishes to select the contents of a window using the graphical tab 70 (corresponding to the "window" option shown in the selection decision 785), the cursor is converted to appear as a targeting crosshair (step 770). If the user right-clicks, the crosshair returns to the normal cursor appearance (step 800), and nothing is selected. If the user left-clicks, the host application obtains the identification (ID) number of the window over which the cursor was positioned. A window listener is then launched (step 810) that watches the window's repaint events. When a repaint event occurs after 2000 ms, the pixels in the window are copied (step 790) and sent as image data to the display unit 56 after conversion and transformation.

Other Embodiments

As an alternative to the fixed data ports 50 along the perimeter of the screen 38 of the monitor 20, wireless data links may be provided. The wireless ports can be in principle unlimited in number and can assume any location along the perimeter of the screen 38. In this case, display units (not shown) having wireless capability are (wirelessly) connected to the processor 62. These ID codes correspond to physical locations along the perimeter of the screen 38. The host system has ID codes that are transmitted through blinking patterns of the pixels on the screen 38, with a sensor in the wireless display unit receiving commands and information from the processor 62. This sensor, or optical input device, is integrated with the wireless display unit and can obtain the ID code corresponding to that location on the screen 38. In this implementation, the wireless display units can be hung directly in front of the screen 38 (e.g., within 2 cm of the screen's surface) by attaching them to the monitor 20 (e.g., magnetically) so that they extend far enough beyond the perimeter of the screen 38 to obtain an ID code through the blinking pixels. When this ID code is then wirelessly transmitted from the wireless display unit to the host system (e.g., the processor 62), the host system responds by providing graphical feedback and a user interaction object on the screen 38 at the location of the ID code. The data transfers also occur through the wireless link. Using this wireless method, the user can physically hold a display unit configured for wireless communication in front of the monitor 20, drag an image or other data from the monitor's GUI to the graphical feedback object (such as a graphical tab 70), thereby copying over data to the display unit 56. Similarly, images and other data may be copied from such a wireless display unit to another processor and its monitor.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

In preferred embodiments of the invention, there is provided media encoded with executable program code to effect any of the methods described herein. This code contains executable instructions that may reside, for example, in the random access memory (RAM) of a processor, or on a hard drive or optical drive of a processor. The instructions may be stored on a magnetic or optical disk or diskette, a disk drive, magnetic tape, electronic read-only memory, or other appropriate data storage device. In preferred embodiments, this program code may be read by a digital processing apparatus such as a processor or computer for performing any one or more of the methods disclosed herein.

What is claimed is:

1. A method, comprising:
   bringing a handheld electronic display unit to a monitor, so that the presence of the display unit is eletronically detected, the display unit and the monitor including respective screens for displaying images, wherein the display unit includes material that permits the display unit to be attached to a surface;
   selecting an image displayed on the monitor's screen;
   electronically copying the selected image to the display unit, wherein the selected image is displayed on the display unit's screen upon completion of said copying;
   transporting the display unit to another location following said copying;
   attaching the display unit to a surface at said another location so that the display unit is conspicuously located; and
   employing the display unit to provide awareness of information displayed on the screen of the conspicuously located display unit, wherein the information displayed on the screen of the display unit serves as a reminder to someone at said another location.

2. The method of claim 1, wherein said material includes a magnet.

3. The method of claim 1, wherein said material includes adhesive.

4. The method of claim 1, wherein a visual indication on the monitor's screen is provided that the display unit has been detected.

5. The method of claim 1, wherein said copying is in response to a user interacting with a graphical user interface on the monitor's screen, with the position of the graphical user interface indicating the location of the display unit.

6. The method of claim 1, comprising directly connecting the display unit to a data port on the monitor such that, when the display unit is connected to the data port, both the display unit and the monitor's screen are visible to a user positioned in front of the monitor.

7. The method of claim 6, wherein the screen of the display unit is substantially parallel to the monitor's screen when the display unit is connected to the data port.

8. The method of claim 6, wherein the monitor includes at least 3 data ports.

9. The method of claim 1, said transporting comprising moving the display unit from one work area to another work area.

10. The method of claim 1, wherein the surface is part of a monitor.

11. The method of claim 1, wherein the surface is a wall.

12. The method of claim 1, wherein the display unit is transported in one's pocket for later reference.

13. The method of claim 1, wherein the display unit acts as a business card.

14. The method of claim 1, wherein the selected image is displayed on the display unit's screen within 5 seconds after said electronic copying is completed.

15. The method of claim 1, wherein the selected image is displayed on the display unit's screen within 1 second after said electronic copying is completed.

16. The method of claim 1, further comprising copying the image on the display unit's screen to a screen of a second monitor.

17. A method, comprising:
providing an electronic display unit in proximity with a monitor, the display unit and the monitor having respective screens for displaying images, wherein the display unit has a back side that includes material that permits the display unit to be attached to a surface;
selecting an image displayed on the monitor's screen;
electronically copying the selected image to the display unit so that the selected image appears on the display unit's screen;
physically transporting the display unit with the copied image to another location;
attaching the display unit to a surface at said another location using said material, wherein said surface is selected so that the display unit is conspicuous when attached; and
using the copied image on the screen of the conspicuously attached display unit to act as a reminder of information contained in the copied image.

18. The method of claim 17, wherein said material includes a magnet.

19. The method of claim 17, wherein said material includes adhesive.

20. The method of claim 17, wherein a visual indication on the monitor's screen is provided that the display unit has been detected.

21. The method of claim 17, wherein said copying is in response to a user interacting with a graphical user interface on the monitor's screen, with the position of the graphical user interface indicating the location of the display unit.

22. The method of claim 17, comprising directly connecting the display unit to a data port on the monitor such that when the display unit is connected to the data port, both the display unit and the monitor's screen are visible to a user positioned in front of the monitor.

23. The method of claim 22, wherein the screen of the display unit is substantially parallel to the monitor's screen when the display unit is connected to the data port.

24. The method of claim 22, wherein the monitor includes at least 3 data ports.

25. The method of claim 17, said transporting comprising moving the display unit from one work area to another work area.

26. The method of claim 17, wherein the surface is part of a monitor.

27. The method of claim 17, wherein the surface is a wall.

28. The method of claim 17, wherein the display unit is transported in one's pocket for later reference.

29. The method of claim 17, wherein the display unit acts as a business card.

30. The method of claim 17, wherein the selected image is displayed on the display unit's screen within 5 seconds after said electronic copying is completed.

31. The method of claim 17, wherein the selected image is displayed on the display unit's screen within 1 second after said electronic copying is completed.

32. The method of claim 17, further comprising copying the image on the display unit's screen to a screen of a second monitor.

33. The method of claim 17, comprising attaching the display unit to a refrigerator door.

34. A method, comprising:
providing an electronic display unit in proximity with a monitor, the display unit and the monitor having respective screens for displaying images;
selecting an image displayed on the monitor's screen;
electronically copying the selected image to the display unit so that the selected image appears on the display unit's screen, wherein the display unit includes attachment material; and
attaching the display unit with the copied image to a surface using said attachment material, said surface being selected so that the display unit is conspicuous when attached to said surface, the display unit with the copied image thereby functioning as a note.

35. The method of claim 34, comprising:
providing on the monitor's screen an indication that the display unit has been detected, the monitor including a port for receiving the display unit, wherein the display unit is detected in response to being connected to the port.

36. The method of claim 35, wherein the port is located near an edge of the monitor's screen so that said indication on the monitor's screen faces toward and is aligned with the display unit when the display unit is connected directly to the port.

37. The method of claim 35, wherein the image as it is displayed on the display unit's screen is large enough that a user can view and understand its contents simply by looking at the display unit's screen.

38. The method of claim 35, wherein the selected image is displayed both on the monitor's screen and the display unit's screen upon completion of said copying.

39. The method of claim 35, wherein said copying comprises a cut and paste command.

40. The method of claim 35, wherein said copying comprises a drag and drop command.

41. The method of claim 35, wherein said copying includes a snapshot window command.

42. The method of claim 35, wherein said copying is in response to a user entering choices into a dialog box.

43. The method of claim 35, wherein said copying is in response to a user interacting with a graphical user interface on the monitor's screen.

44. The method of claim 35, wherein said copying is in response to a user interacting with a graphical user interface on the monitor's screen, with the position of the graphical user interface indicating the location of the display unit.

45. The method of claim 44, wherein the graphical user interface is displayed near an edge of the monitor's screen.

46. A computer program product comprising a computer usable medium for carrying out the method of claim 35.

47. The method of claim 34, further comprising:
bringing the display unit to a second monitor that is at a location different from the location of the first monitor; and
electronically copying the selected image from the display unit onto the screen of the second monitor via a processor associated with the second monitor.

48. The method of claim 47, further comprising:
in response to a user connecting the display unit to a port on the second monitor, providing an indication on the second monitor's screen that the display unit has been connected to the port on the second monitor; and
providing a graphical user interface on the second monitor's screen to permit a user to copy the selected image to the second monitor's screen.

49. The method of claim 48, wherein copying the selected image to the second monitor's screen is in response to a user moving a cursor towards the physical location of the display unit.

50. The method of claim 34, wherein the presence of the display unit is electronically detected in response to the display unit being brought within 5 cm of the monitor's screen.

51. The method of claim 34, wherein the presence of the display unit is electronically detected in response to the display unit being brought within 2 cm of the monitor's screen.

52. The method of claim 34, the method comprising posting the display unit on a surface in an office.

53. The method of claim 34, wherein the display unit is given away.

54. The method of claim 34, wherein said attachment material includes a magnet.

55. The method of claim 34, wherein said surface includes part of a monitor.

56. The method of claim 34, comprising attaching the display unit with the copied image to a wall.

57. The method of claim 34, comprising attaching the display unit with the copied image to a refrigerator door.

58. The method of claim 34, further comprising:
providing on the monitor's screen an indication that the display unit has been detected, the monitor including a port for receiving the display unit, wherein the display unit is detected in response to being connected to the port, and wherein the port is located near an edge of the monitor's screen so that said indication on the monitor's screen faces toward the display unit when the display unit is connected directly to the port.

59. The method of claim 34, wherein said copying is in response to a user interacting with a graphical user interface on the monitor's screen, with the position of the graphical user interface indicating the location of the display unit.

60. The method of claim 34, said proximity providing step including connecting the display unit to a data port on the monitor such that, when the display unit is connected directly to the data port, both the display unit and the monitor's screen are visible to a user positioned in front of the monitor.

61. The method of claim 60, wherein the screen of the display unit is substantially parallel to the monitor's screen when the display unit is connected to the data port.

62. The method of claim 34, wherein said copying is in response to a user interacting with a graphical user interface, wherein the graphical user interface appears entirely on the monitor's screen throughout said copying, and wherein the graphical user interface is positioned on the monitor's screen to indicate the location of the display unit with respect to the monitor's screen.

63. The method of claim 62, wherein the selected image is displayed on the display unit's screen upon completion of said copying.

* * * * *

UNITED STATES PATENT AND TRADEMARK OFFICE
CERTIFICATE OF CORRECTION

| | | |
|---|---|---|
| PATENT NO. | : 7,046,213 B2 | Page 1 of 1 |
| APPLICATION NO. | : 10/164883 | |
| DATED | : May 16, 2006 | |
| INVENTOR(S) | : Christopher Campbell et al. | |

It is certified that error appears in the above-identified patent and that said Letters Patent is hereby corrected as shown below:

On the title page of the patent, add the following:

(73)     Assignee     International Business Machines Corporation, Armonk, NY (US)

Signed and Sealed this

Fifth Day of September, 2006

JON W. DUDAS
*Director of the United States Patent and Trademark Office*